United States Patent

Pierre et al.

[11] 3,939,946  
[45] Feb. 24, 1976

[54] ASSEMBLY COMPRISING A WHEEL AND A DISC BRAKE DISC, IN PARTICULAR FOR A RAILWAY VEHICLE

[75] Inventors: Jacques Pierre, Belleville; Pierre Simon, Pont-a-Mousson, both of France

[73] Assignee: Pont-A-Mousson S.A., Nancy, France

[22] Filed: Oct. 10, 1974

[21] Appl. No.: 513,786

[30] Foreign Application Priority Data
Oct. 15, 1973 France .............................. 73.36659
Sept. 25, 1974 France .............................. 74.32309

[52] U.S. Cl. ........ 188/218 XL; 192/107 R; 301/6 E
[51] Int. Cl.² ......................................... F16D 65/12
[58] Field of Search ........ 188/218 XL, 71.1, 264 A, 188/264 AA; 192/107 R; 301/6 R, 6 CS, 6 CF, 6 E

[56] References Cited
UNITED STATES PATENTS

| | | | |
|---|---|---|---|
| 1,567,915 | 12/1925 | Cole ..................................... | 301/6 E |
| 1,864,252 | 6/1932 | McCain et al. .................. | 192/107 R |
| 2,742,107 | 4/1956 | DuBois........................ | 188/264 AA |
| 3,530,960 | 9/1970 | Otto et al. .................... | 188/218 XL |

FOREIGN PATENTS OR APPLICATIONS

| | | | |
|---|---|---|---|
| 1,105,370 | 3/1968 | United Kingdom .......... | 188/218 XL |
| 1,239,851 | 7/1971 | United Kingdom .......... | 188/218 XL |

*Primary Examiner*—Trygve M. Blix
*Assistant Examiner*—Edward R. Kazenske
*Attorney, Agent, or Firm*—Sughrue, Rothwell, Mion, Zinn & Macpeak

[57] ABSTRACT

The assembly is of the type in which the disc has a braking surface for cooperation with a brake pad and the wheel has a radially-extending web and an axial annular surface. A centering device centers the disc relative to the axial annular surface. The disc has on the side thereof opposed to the braking surface a second surface which frictionally engages a third surface defined by the wheel of the web. The second or third surface is constituted by a material having a coefficient of friction on the third or second surface which is higher than that of the braking surface of the disc on the brake pad so that, upon braking, the disc does not slip relative to the wheel.

26 Claims, 6 Drawing Figures

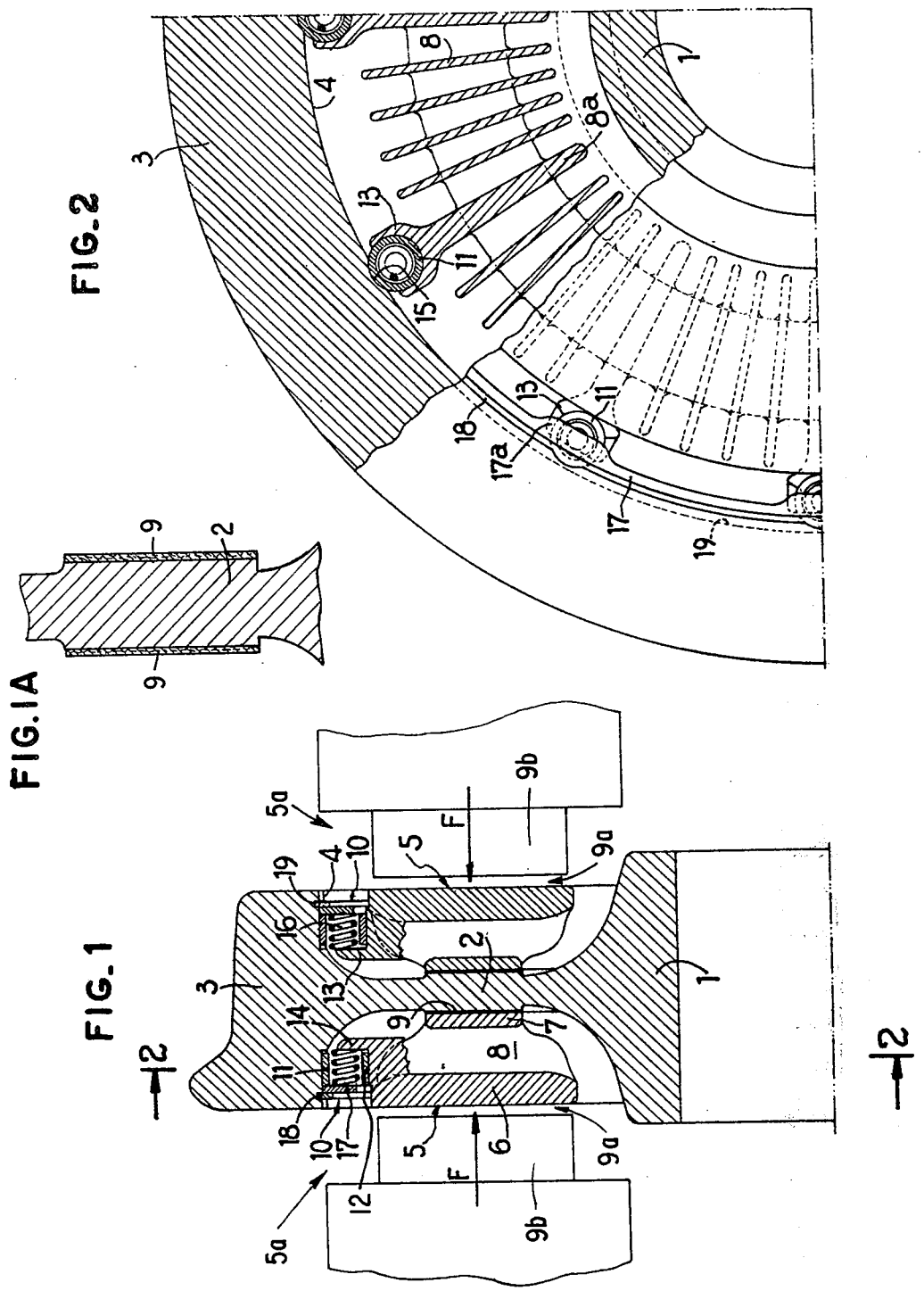

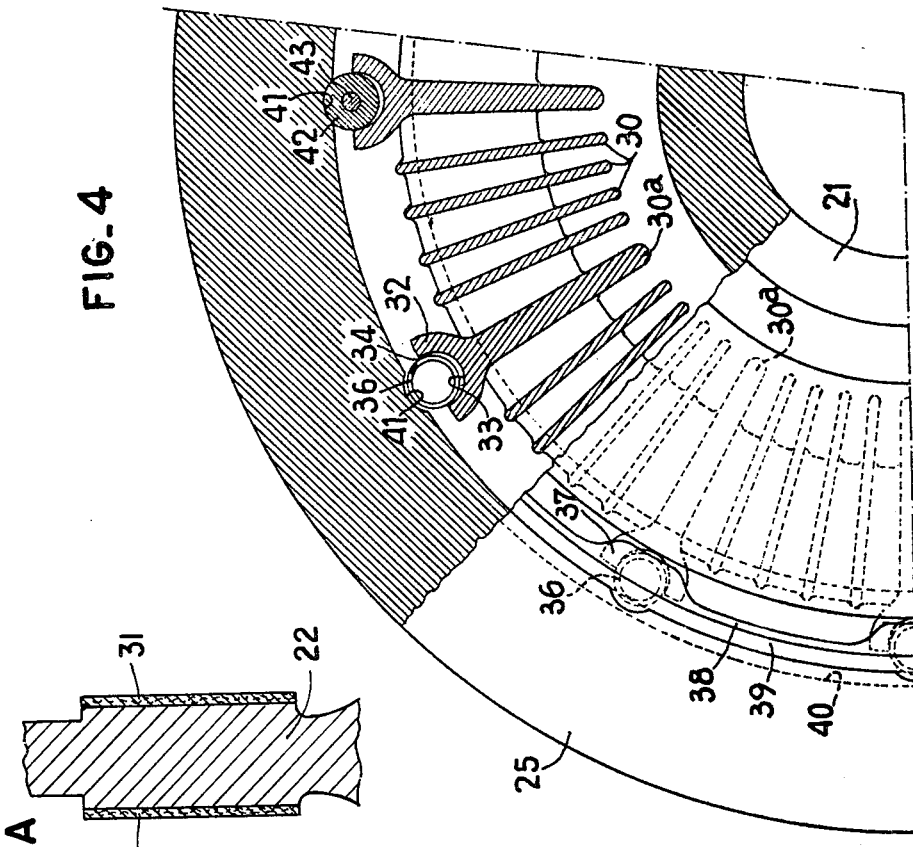
FIG._4
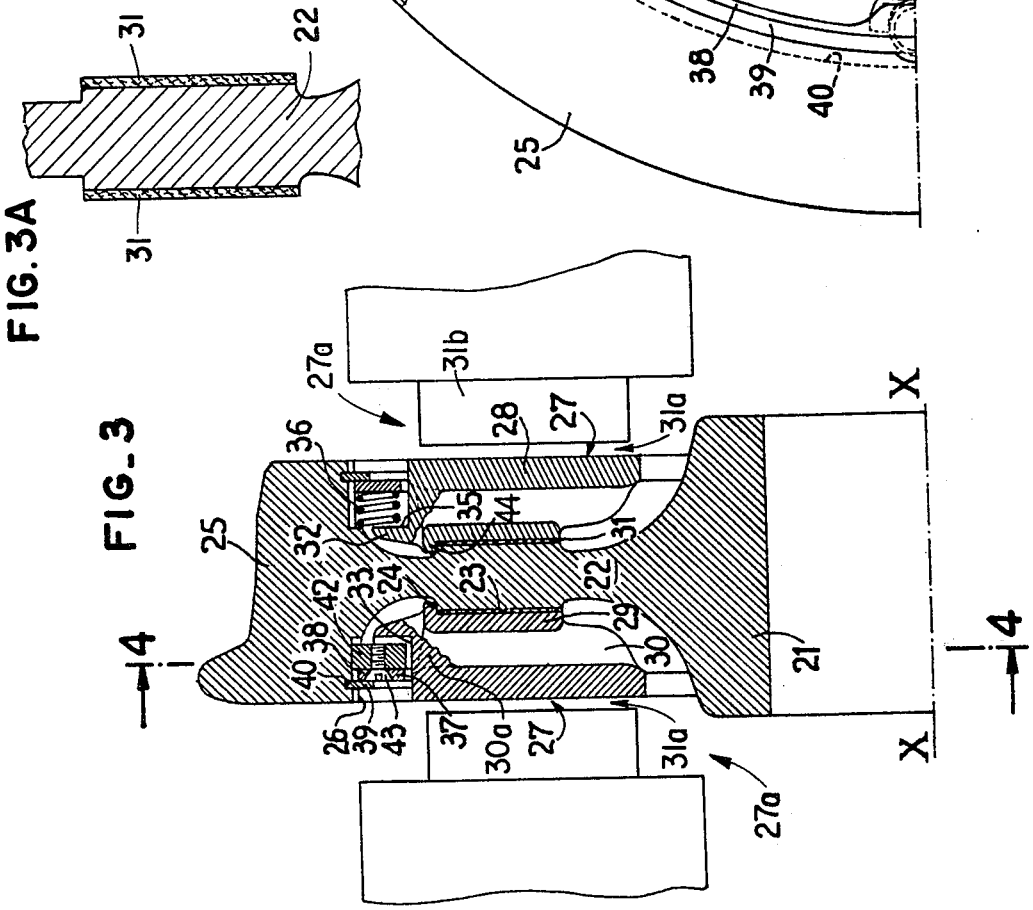
FIG.3A
FIG._3

ASSEMBLY COMPRISING A WHEEL AND A DISC BRAKE DISC, IN PARTICULAR FOR A RAILWAY VEHICLE

The present invention relates to an assembly comprising a wheel and a disc of a disc brake in particular for a railway vehicle.

Disc brakes are known which comprise two discs of the type in which each disc has a radial and annular friction surface, the two discs being adapted to be rendered integral, on each side of the surface, with a wheel comprising a radial web and an annular, roughly axial, surface. The discs are usually rendered integral with the web part of the wheel by keying or screwing the parts together, this connection being arranged to be resilient bearing in mind that the web of the wheel is usually of steel and the discs are of cast iron and that there occurs in the course of braking a heating which brings about different expansions between the web and the discs.

Now, such keyed or screwed connections of the various parts require in the course of the manufacture of the discs and the wheels a long and costly machining of all the parts, and in particular a drilling of the web of the wheel which creates additional stresses in the web which might cause cracking of the latter when braking.

An object of the present invention is to provide an assembly comprising a wheel and a disc brake disc which permits the transmission of the braking force to the wheel and requires a connection of the disc to the wheel which avoids the aforementioned drawbacks.

According to the invention there is provided an assembly comprising a wheel and a disc of a disc brake of the type in which the disc has a braking surface adapted to cooperate with a brake pad and the wheel comprises a radial web and an annular substantially axially extending surface, wherein a device centers the disc on the substantially axially extending surface of the wheel and the disc carries, on the axially opposite side to its braking surface, a radial friction surface, said radial friction surface, or the confronting surface of the web of the wheel, being constituted by a material whose coefficient of friction on the material of the other confronting surface exceeds the coefficient of friction of the braking surface on the brake pad.

Thus, each brake disc is both suitably centered on the wheel and rendered integral in an effective manner with the web of the wheel when braking, the connection between the wheel and the disc being ensured with no drilling or any other particular machining of the wheel. The mounting of the disc on the wheel is moreover particularly simple and rapid.

In a first embodiment of the invention, the centering device comprises sleeves which have an axis parallel to the axis of the assembly and are evenly spaced apart peripherally of the assembly and interposed between a radial outer surface of the disc and the substantially axially extending surface of the wheel.

In a second embodiment of the invention, said annular surface of the wheel comprises an outwardly facing first part and an inwardly facing second part coaxial with the first part and the centering device comprises cold centering means which are applied by the disc against said first part in non braking periods and hot centering means which are applied by the disc against said second part during braking periods. Thus there is no elastic deformation of parts.

Further features and advantages of the invention and its operation will be described hereinafter with reference to the accompanying drawings given by way of example and in which:

FIG. 1 is a half radial sectional view, with a part cut away, of an assembly comprising a railway vehicle wheel equipped on each side of the web of the wheel with two brake discs in accordance with a first embodiment of the invention;

FIG. 1A is a partial radial sectional view of a modification;

FIG. 2 is a left half sectional view taken on line 2—2 of FIG. 1;

FIG. 3 is a half radial sectional view similar to FIG. 1 of a second embodiment of the invention;

FIG. 3A is a partial radial sectional view of a modification, and

FIG. 4 is a left half sectional view taken on line 4—4 of FIG. 3.

The assembly shown in FIGS. 1 and 2 comprises a wheel which is of steel and has a hub 1, a radial web 2 having planar surfaces and a peripheral rim 3 having on each side of the web two inner cylindrical axially extending surfaces 4. On each side of the web 2 and inside annular cavities defined by the web and the rim there are disposed two cast iron brake discs 5 of a disc brake diagrammatically and partially shown at $5^a$. Each one of these discs is constituted by two annular plates or rings 6 and 7 disposed in parallel radially extending planes and interconnected by ribs 8 disposed in radial axial planes. The outer surfaces of the inner rings 7 of the two discs are covered with a layer 9 constituted by a friction material whose coefficient of friction on steel of the wheels is higher than the coefficient of friction of cast iron on the surface $9^a$ defined by brake pads $9^b$ of the disc brakes $5^a$.

Each disc has a centering device 10 which is disposed in an annular space between the disc and the corresponding cylindrical surface 4 of the rim of the wheel. Each device is constituted by metal elastically yieldable sleeves 11 which are disposed in cavities 12 formed in projecting portions 13 located at the outer radial ends of certain ribs $8^a$ of the ribs which are evenly spaced apart peripherally of the disc and have a larger section than the other ribs 8. The cavities 12 have a generally cylindrical shape with a section which approximately corresponds to two thirds of a circle and they are axially upen on the other side of the disc whereas at the other end they have an end wall 14. The part of the sleeve 11 outside the projecting portions 13 bears in recesses 15 which also have a cylindrical shape and are machined in the surface 4 of the rim of the wheel. These elastically yieldable metal sleeves 11 are adapted to radially compensate for expansions that the discs 5 undergo in the course of braking with respect to the rim 3 of the wheel which remains relatively colder. Inside each sleeve 11 there is disposed a compression spring 16 which bears against the end wall 14 of the corresponding cavity 12 and against an annular closed collar 17 whose outside diameter corresponds to the diameter of the surface 4 of the rim and which urges all of the sleeves 11 against the bottom of the cavities, this collar being maintained in this position by a resiliently yieldable ring of the circlip type 18 which is disposed in a groove 19 formed in the surface 4 of the rim of the wheel. The radial size of the collar 17 is for its major part relatively small but it widens in the region of the thick ribs $8^a$ so as to cover the major part of the section of the sleeves 11 and springs 16. The interposition of this collar 17 between the sleeves and the ring 18 enables the latter to be given a relatively small radial size which facilitates the assembly. The axes of the sleeves 11, springs 16 and cavities 12 are of course parallel to the axis of the assembly of the wheel.

The assembly described with reference to FIGS. 1 and 2 operates in the following manner:

When braking, an axial force F is applied by the pad $9^b$ against each of the outer rings 6 of the discs. Owing to the action of the layers of friction material 9, this force renders the discs 5 integral with the wheel to rotate the latter. The force F then produces in the region of this connection of the disc with the web of the wheel a tangential force and a normal force which are such that this tangential force is less than that produced in the region of the contact of the outer rings 6 with the surface $9^a$ of the brake pads ($9^b$) which apply the forces F, bearing in mind that the material of the layers 9 has a coefficient of friction higher than that of the brake pads on the outer rings 6. Consequently, there is no rotation of the discs 5 with respect to the web 2 of the wheel.

Moreover, during the progressive heating of the discs 5 in the course of braking, the expansion of these discs causes the metal sleeves 11 to be urged against the surface 4 of the rim 3 of the wheel.

Thus, owing to the presence of the layers 9 of friction material, it is unnecessary to provide the wheels with apertures and there is no danger of wheel cracking. The centering devices 10 moreover ensure a suitable maintenance of the discs 5 which is elastic in the case of heating.

The assembly thus provided is simple and cheap and allows an excellent cooling of the discs owing to a large passage of air inside the discs, there being no means for attaching the discs to the wheel which would prevent this cooling.

Moreover, an essential advantage must be stressed constituted by the facility of assembly of this type of disc with a wheel.

By way of a modification, the continuous layers 9 of friction material could be replaced by circumferentially-spaced areas of friction material.

It will also be understood that by way of an alternative arrangement as shown in FIG. 1A, it may be the surface of the web 2 of the wheel and not the friction surface of the disc which is constituted by a layer 9 of material having a high coefficient of friction.

The wheel of the assembly shown in FIGS. 3 and 4 of axis X-X is of steel and comprises a hub 21, a radial web 22 having planar surfaces 23 which are raised in the median region of the web so as to form an annular shoulder 24 which faces radially outwardly, and a peripheral rim 25 having on each side of the web two inner surfaces 26 having a generally cylindrical shape. On each side of the web 22 and inside annular cavities defined by the web and the rim there are disposed two cast iron brake discs 27 of a disc brake diagrammatically and partially shown at $27^a$. Each of the discs is constituted by two annular plates or rings 28 and 29 disposed in parallel planes perpendicular to the axis X—X interconnected by ribs 30 disposed in radial axial planes. The outer surfaces of the inner rings 29 of the two discs are covered with a layer 31 constituted by a friction material whose coefficient of friction on the steel of the wheels is higher than the coefficient of friction of the cast iron on surface $31^a$ defined by brake pads $31^b$ of the disc brakes $27^a$.

FIG. 3A shows an alternative arrangement in which the layer 31 is provided on the planar surfaces 23 of the web 22 instead of on the outer surfaces of the inner rings 29.

Each disc 27 has a number of ribs $30^a$ whose section is larger than the other ribs 30 and which terminate outwardly in a projecting portion 32 in which is formed a cavity 33 which has the shape of a semi-cylinder which is open radially outwardly and radially extended on each side in this direction by two small substantially planar parallel surfaces 34. The cavities 32 are axially open toward the exterior of the disc whereas at the other end they have an end wall 35. In the illustrated assembly, the ribs $30^a$ are spaced angularly 30° apart.

Disposed in each cavity 33, except in three thereof spaced angularly 120° apart, is a compression coil spring 36 whose diameter is slightly less than the diameter of the cavity and which is maintained compressed by an enlarged portion 37 of a maintaining collar 38.

The collar 38 has a small radial size and an enlarged portion 37 in the region of each thick rib $38^a$. It is circular on the outside and has a diameter very slightly less than that of the surface 26 of the rim 25. An open ring 39 of the circlip type is disposed in a groove 40 in the surface 26 and maintains the collar 38 in position in opposition to the action of the springs 36 which thus permanently urge the discs against the web of the wheel.

A cylindrical recess 41 is formed in the surface 26 in the region of each cavity 33. The radially outer part of the springs 36 is disposed in corresponding recesses 41.

The three cavities 33 devoid of a spring 36 each serve as a housing for a roller 42 whose spindle is constituted by a screw 43 which extends through the corresponding portion 37 of the collar 38. The radial position of the axis of the screw 43 corresponds to the end of the projecting portion 32 and the diameter of the roller 42 is equal to the diameter of the cavity 33 so that this roller is fixed relative to the wheel and is constantly in contact with the corresponding recess 41 and with the associated planar surfaces 34 and it defines, in the cold state of the assembly, a radial clearance with the radially inner surface of its cavity 33. The dimensions are such that this clearance is compensated for by the relative expansion of the disc when braking so that the three rollers constitute a centering device of the disc in the hot state of the assembly.

Each disc further comprises a centering device, in the cold state of the assembly, constituted by an annular axial flange 44 which projects from the inner ring 29 of the disc, this flange bearing, in the cold state of the assembly, radially on the corresponding shoulder 24 of the web.

The interposition of the collar 38 between the rollers and springs and the ring 39 enables the latter to be formed with a relatively small radial size which facilitates the assembly. The axes of the rollers 42, springs 36 and cavities 33 are parallel to the axis X—X of the wheel assembly.

The assembly just described operates in the following manner:

When braking, an axial force F is applied to each one of the outer rings 28 of the discs by the pads $31^b$ and, owing to the action of the layers of friction material 31, this force renders the discs 27 integral with the wheel so as to rotate with the latter. Indeed, as the material of the layers 31 has a coefficient of friction on steel higher than that of the brake pads on the outer rings 28, there can be no rotation between the discs and the web of the wheel.

During the progressive heating of the discs 27 in the course of braking, the radial expansion of these discs decreases the clearance between the rollers and cavities 33 so that each disc is centered by these rollers when the discs are heated. Note that these rollers and the planar surfaces 34 also afford on approximate centering of the discs in the cold state of the assembly.

During the non-braking periods when the discs are cool, the centering is achieved by cooperation between the shoulders 24 of the web and the flange 44 of the inner rings 29. This cooperation ceases in the hot state of the assembly during braking. The discs are maintained against the web of the wheel, on one hand, by the clamping effect of the centering devices and, on the other, by the springs 36 which are compressed upon assembly between the end walls 35 of the cavities 33 and the collar 38. Moreover, during the braking, the axial compression of the springs is added to the force F and reinforces the connection between the discs and wheel.

Thus as in the embodiment shown in FIGS. 1 and 2, owing to the action of the layers 31 of friction material, the discs 27 are rotated by the wheel with no connection requiring a drilling of the wheel. The cold and hot centering devices moreover hold the discs suitably in position irrespective of the temperature of these discs and after each braking the assembly exactly resumes its initial position. The metal rollers 42 also ensure that the discs are driven by the wheel and this can compensate for any accidental ineffectiveness of the transmission of the rotation by the friction material 31.

In the assembly shown in FIGS. 3 and 4, the cavities 33 which contain the rollers are angularly staggered from one disc to the other and there is disposed in front of each of these cavities a cavity 33 containing a spring 36. However, this arrangement is not absolutely necessary for good operation of the assembly.

Having now described our invention what we claim as new and desire to secure by Letters Patent is:

1. An assembly comprising a wheel having a radially-extending web and an annular substantially axially-extending surface, a disc brake comprising a brake pad structure movable axially of the wheel and defining a brake pad surface, a disc structure which is coaxial with the wheel and defines a braking first surface for cooperation with the brake pad surface and defines a radially-extending friction second surface axially opposed to said first surface, the web structure defining a radially-extending third surface adjacent to said second surface for frictional engagement with said second surface upon application of the brake pad structure against the disc structure for braking, and a device centering the disc structure on the substantially axially extending surface of the wheel, one of said second and third surfaces having a coefficient of friction on the other of said second and third surfaces which exceeds the coefficient of friction of said first surface on the brake pad surface.

2. An assembly as claimed in claim 1, wherein it is said second surface which has a coefficient of friction which exceeds the coefficient of friction of said first surface on the brake pad surface.

3. An assembly as claimed in claim 1, wherein it is said third surface which has a coefficient of friction which exceeds the coefficient of friction of said first surface on the brake pad surface.

4. An assembly as claimed in claim 1, wherein the wheel has a rim defining the annular substantially axially-extending surface and the centering device is located on an outer periphery of the disc structure and bears against the annular substantially axially-extending surface.

5. An assembly comprising a wheel having a radially-extending web and an annular substantially axially-extending surface, a disc brake comprising a brake pad structure movable axially of the wheel and defining a brake pad surface, a disc structure which is coaxial with the wheel and defines a braking first surface for cooperation with the brake pad surface and defines a radially-extending friction second surface axially opposed to said first surface, the web structure defining a radially-extending third surface adjacent to said second surface for frictional engagement with said second surface upon application of the brake pad structure against the disc structure for braking, and a device centering the disc structure on the substantially axially extending surface of the wheel, one of said second and third surfaces having a coefficient of friction on the other of said second and third surfaces which exceeds the coefficient of friction of said first surface on the brake pad surface, the centering device comprising sleeves which have axes parallel to the axis of the assembly and are evenly spaced apart peripherally of the disc structure, which disc structure has a radially outer surface for each sleeve, the sleeves being interposed between the radially outer surface of the disc structure and the substantially axially-extending surface of the wheel.

6. An assembly as claimed in claim 5, comprising a cavity in the radially outer surface of the disc structure for each sleeve.

7. An assembly as claimed in claim 6, wherein the disc structure comprises two rings and radial ribs interconnecting the rings, some of the ribs having projecting portions which are located at outer ends of the ribs and respectively define said cavities.

8. An assembly as claimed in claim 7, wherein the ribs having the projecting portions have a larger section than the other ribs.

9. An assembly as claimed in claim 6, wherein the cavities are closed axially of the wheel by an end wall at one end and open at an axially opposite end of the cavities, the sleeves bear at one end of the sleeves against said end wall, and retaining means which bear axially against the wheel retain the opposite end of the sleeves.

10. As assembly as claimed in claim 9, wherein the retaining means for the sleeves comprise a collar bearing against the sleeves, a groove in the wheel, and a ring engaged in the groove and axially retaining the collar.

11. An assembly as claimed in claim 6, further comprising recesses in the substantially axially-extending surface of the wheel in which recesses the sleeves respectively bear.

12. An assembly comprising a wheel having a radially-extending web, a brake pad structure movable axially of the wheel and defining a brake pad surface, a disc structure which is coaxial with the wheel and defines a braking first surface for cooperation with the brake pad surface and defines a radially-extending friction second surface axially opposed to said first surface, the web structure defining a radially-extending third surface adjacent to said second surface for frictional engagement with said second surface upon application of the brake pad structure against the disc structure for braking, the wheel having a radially outwardly facing first circumferentially extending face and a radially inwardly facing second circumferentially extending face coaxial with the first circumferentially extending face, and a centering device centering the disc structure on the wheel and comprising centering means for a cold state of the assembly which are applied by the disc structure against said first circumferentially extending face in non-braking periods, and centering means for a hot state of the assembly which are applied by the disc structure against said second circumferentially extending face during braking periods, one of said second and third surfaces having a coefficient of friction on the other of said second and third surfaces which exceeds the coefficient of friction of said first surface on the brake pad surface.

13. An assembly as claimed in claim 12, wherein the cold centering means comprise an annular axially-extending flange of the disc structure which defines an inner surface which engages in the cold state of the assembly with said first circumferentially extending face which is in the form of an annular shoulder of the web.

14. An assembly as claimed in claim 13, wherein the wheel has a rim which defines said second annular surface and the hot centering means comprise an outer periphery of the disc structure, rollers which have their axes parallel to the axis of the assembly and are evenly spaced apart peripherally of said second circumferentially extending face, the rollers being interposed with a radial clearance, in the cold state of the assembly, between said second circumferentially extending face and the outer periphery of the disc structure.

15. An assembly comprising a wheel having a radially-extending web, a brake pad structure movable axially of the wheel and defining a brake pad surface, a disc structure which is coaxial with the wheel and defines a braking first surface for cooperation with the brake pad surface and defines a radially-extending friction second surface axially opposed to said first surface, the web structure defining a radially-extending third surface adjacent to said second surface for frictional engagement with said second surface upon application of the brake pad structure against the disc structure for braking, the wheel having a radially outwardly facing first circumferentially extending face and a radially inwardly facing second circumferentially extending face coaxial with the first circumferentially extending face, and a centering device centering the disc structure on the wheel and comprising centering means for a cold state of the assembly which are applied by the disc structure against said first circumferentially extending face in non-braking periods, and centering means for a hot state of the assembly which are applied by the disc structure against said second circumferentially extending face during braking periods, one of said second and third surfaces having a coefficient of friction on
 the other of said second and third surfaces which exceeds the coefficient of friction of said first surface on the brake pad surface, the wheel having a rim which defines said second circumferentially extending face, the cold centering means comprising an annular axially-extending flange of the disc structure which defines an inner surface which engages in the cold state of the assembly with said first circumferentially extending face which is in the form of an annular shoulder of the web, the hot centering means comprising an outer periphery of the disc structure, rollers which have their axes parallel to the axis of the assembly and are evenly spaced apart peripherally of said second circumferentially extending face, the rollers being interposed with a radial clearance, in the cold state of the assembly, between said second circumferentially extending face and the outer periphery of the disc structure, the disc structure comprising two rings and radial ribs interconnecting the rings, means for carrying the rollers comprising support means integral with the rim of the wheel and projecting portions located at outer ends of first ones of said ribs, radially outwardly open cavities respectively in said projecting portions and containing the rollers with a clearance radially of the wheel axis in the cold state of the assembly which is sufficient to allow radial expansion of the disc structure when braking but such as to allow the rollers to radially engage the cavities and thereby center the disc structure relative to the wheel in the hot state of the assembly.

16. An assembly as claimed in claim 15, wherein the ribs having projecting portions have a larger section than the other ribs.

17. An assembly as claimed in claim 15, wherein the cavities are axially open on a side of the disc structure remote from the web of the wheel and the rollers are axially retained in the cavities by the roller support means.

18. An assembly comprising a wheel having a radially-extending web, a brake pad structure movable axially of the wheel and defining a brake pad surface, a disc structure which is coaxial with the wheel and defines a braking first surface for cooperation with the brake pad surface and defines a radially-extending friction second surface axially opposed to said first surface, the web structure defining a radially-extending third surface adjacent to said second surface for frictional engagement with said second surface upon application of the brake pad structure against the disc structure for braking, the wheel having a radially-outwardly facing first circumferentially extending face and a radially inwardly facing second circumferentially extending face coaxial with the first circumferentially extending face, and a centering device centering the disc structure on the wheel and comprising centering means for a cold state of the assembly which are applied by the disc structure against said first circumferentially extending face in non-braking periods, and centering means for a hot state of the assembly which are applied by the disc structure against said second circumferentially extending face during braking periods, the wheel having a rim which defines said second circumferentially extending face, the cold centering means comprising an annular axially-extending flange of the disc structure which defines an inner surface which engages in the cold state of the assembly with said first circumferentially extending face which is in the form of an annular shoulder of the web, the hot centering means comprising an outer periphery of the disc structure, rollers which have their axes parallel to the axis of the assembly and are evenly spaced apart peripherally of said second circumferentially extending face, the rollers being interposed with a radial clearance, in the cold state of the assembly, between said second circumferentially extending face and the outer periphery of the disc structure, the disc structure comprising two rings and radial ribs interconnecting the rings, means for carrying the rollers comprising support means integral with the rim of the wheel and projecting portions located at outer ends of first ones of said ribs, radially outwardly open cavities respectively in said projecting portions and containing the rollers with a clearance radially of the wheel axis in the cold state of the assembly which is sufficient to allow radial expansion of the disc structure when braking but such as to allow the rollers to radially engage the cavities and thereby center the disc structure relative to the wheel in the hot state of the assembly, the support means comprising a groove in the wheel, a ring engaged in the groove, a collar interposed between the ring in the groove and the rollers, and spindles fixed to the collar, the rollers being rotatably mounted on the spindles.

19. An assembly as claimed in claim 1, comprising elastically yieldable means which are supported by the wheel and bias the disc structure against the wheel.

20. An assembly as claimed in claim 5, comprising elastically yieldable means which are supported by the wheel and bias the disc structure against the wheel, the elastically yieldable means being constituted by compression springs disposed inside the centering sleeves.

21. An assembly comprising a wheel having a radially-extending web, a brake pad structure movable axially of the wheel and defining a brake pad surface, a disc structure which is coaxial with the wheel and defines a braking first surface for cooperation with the brake pad surface and defines a radially-extending friction second surface axially opposed to said first surface, the web structure defining a radially-extending third surface adjacent to said second surface for frictional engagement with said second surface upon application of the brake pad structure against the disc structure for braking, the wheel having a radially-outwardly facing first circumferentially extending face and a radially inwardly facing second circumferentially extending face coaxial with the first circumferentially extending face, and a centering device centering the disc structure on the wheel and comprising centering means for a cold state of the assembly which are applied by the disc structure against the first circumferentially extending face in non-braking periods, and centering means for a hot state of the assembly which are applied by the disc structure against said second circumferentially extending face during braking periods, the wheel having a rim which defines said second circumferentially extending face, the cold centering means comprising an annular axially-extending flange of the disc structure which defines an inner surface which engages in the cold state of the assembly with said first circumferentially extending face which is in the form of an annular shoulder of the web, the hot centering means comprising an outer periphery of the disc structure, rollers which have their axes parallel to the axis of the assembly and are evenly spaced apart peripherally of said second circumferentially extending face, the rollers being interposed with a radial clearance, in the cold state of the assembly, between said second circumferentially extending face and the outer periphery of the disc structure, the disc structure comprising two rings and radial ribs interconnecting the rings, means for carrying the rollers comprising support means integral with the rim of the wheel and projecting portions located at outer ends of first ones of said ribs, radially outwardly open cavities respectively in said projecting portions and containing the rollers with a clearance radially of the wheel axis in the cold state of the assembly which is sufficient to allow radial expansion of the disc structure when braking but such as to allow the rollers to radially engage the cavities and thereby center the disc structure relative to the wheel in the hot state of the assembly, a projecting portion on a radially outer end of second ones of the ribs other than said first ones of said ribs, further cavities in said second ones of said ribs, compression springs disposed in said further cavities for biasing the disc structure against the wheel, means combined with the wheel for supporting one end of said springs, said further cavities having inner end walls against which end walls said springs bear.

22. An assembly as claimed in claim 21, wherein the support means comprise a groove in the wheel, a ring engaged in the groove, a collar interposed between the ring in the groove and the rollers, and spindles fixed to the collar, the rollers being rotatably mounted on the spindles and the springs being compressed between said inner end walls of the further cavities and the collar.

23. An assembly as claimed in claim 15, wherein recesses are formed in said second part of the rim in radial alignment with said cavities of said first ones of said ribs for freely receiving a peripheral portion of the rollers whereby the rollers are maintained in position circumferentially of the wheel.

24. An assembly as claimed in claim 15, wherein the support means comprise a groove in the wheel, a ring engaged in the groove, a collar interposed between the ring in the groove and the rollers, and spindles fixed to the collar, the rollers being rotatably mounted on the spindles.

25. An assembly as claimed in claim 15, comprising a projecting portion on a radially outer end of second ones of the ribs other than said first ones of said ribs, further cavities in said second ones of said ribs, compression springs disposed in said further cavities for biasing the disc structure against the wheel, means combined with the wheel for supporting one end of said springs, said further cavities having inner end walls against which end walls said springs bear.

26. An assembly as claimed in claim 25, wherein the support means comprise a groove in the wheel, a ring engaged in the groove, a collar interposed between the ring in the groove and the rollers, and spindles fixed to the collar, the rollers being rotatably mounted on the spindles and the springs being compressed between said inner end walls of the further cavities and the collar.

* * * * *